(12) United States Patent
Lee et al.

(10) Patent No.: US 7,691,911 B2
(45) Date of Patent: Apr. 6, 2010

(54) POLYOLEFIN-BASED AEROGELS

(75) Inventors: Je Kyun Lee, Brookline, MA (US); Gerogle L. Gould, Mendon, MA (US)

(73) Assignee: Aspen Aerogels, Inc., Northborough, MA (US)

(*) Notice: Subject to any disclaimer, the term of this patent is extended or adjusted under 35 U.S.C. 154(b) by 794 days.

(21) Appl. No.: 11/287,777

(22) Filed: Nov. 28, 2005

(65) Prior Publication Data
US 2006/0116433 A1 Jun. 1, 2006

Related U.S. Application Data

(60) Provisional application No. 60/631,235, filed on Nov. 26, 2004.

(51) Int. Cl.
*C08J 9/00* (2006.01)
*C08J 9/28* (2006.01)

(52) U.S. Cl. .............. 521/50; 521/61; 521/62; 521/64; 521/142; 521/143; 521/150

(58) Field of Classification Search ........... 521/50, 521/61, 62, 64, 142, 143, 150
See application file for complete search history.

(56) References Cited

U.S. PATENT DOCUMENTS

| | | | |
|---|---|---|---|
| 3,546,184 A | 12/1970 | Heidel | |
| 4,080,493 A | 3/1978 | Yasui et al. | |
| 4,161,571 A | 7/1979 | Yasui et al. | |
| 5,081,163 A | 1/1992 | Pekala | |
| 5,420,168 A | 5/1995 | Mayer et al. | |
| 5,476,878 A | 12/1995 | Pekala | |
| 5,478,867 A | 12/1995 | Tabor | |
| 5,484,818 A | 1/1996 | De Vos et al. | |
| 5,552,228 A | 9/1996 | Fong | |
| 5,556,892 A | 9/1996 | Pekala | |
| 5,744,510 A | 4/1998 | Pekala | |
| 5,869,545 A | 2/1999 | Biesmans et al. | |
| 5,942,553 A | 8/1999 | Biesmans et al. | |
| 5,962,586 A | 10/1999 | Harper | |
| 5,990,184 A | 11/1999 | Biesmans | |
| 6,806,299 B2 | 10/2004 | Baumann et al. | |
| 7,078,359 B2 | 7/2006 | Stepanian et al. | |
| 2005/0131089 A1* | 6/2005 | Kocon et al. .............. 521/50 | |

FOREIGN PATENT DOCUMENTS

| | | |
|---|---|---|
| EP | 1485431 A2 | 9/2003 |
| EP | 1512714 A1 | 3/2005 |
| WO | WO 03/078505 * | 9/2003 |

OTHER PUBLICATIONS

T. Whelan, Polymer Technology Dictionary, Gapman & Hall, 1994, p. 331.*
Organic Rubber Aerogel as Thermal Insulation and Radiation Shield, NASA SBIR Proposal Summary, 02-II H401-8164, Oct. 3, 2003.*
Tan et al., "Organic Aerogels with Very High Impact Strength" Advanced Materials (2001) 13 (9): 644-646.
Leventis et al., "Nanoengineering Strong Silica Aerogels" Nano Letters (2002) 2 (9): 57-60.
Biesmans et al., "Polyurethane based organic aerogels and their transformation into carbon aerogels" Journal of Non-Crystalline Solids (1998) 225 (1): 64-88.
Zhang et al., "Isocyanate cross-linked silica, structurally strong aerogels" Polymer Preprints (2003) 44 (1): 35-36.
Schmidt, "New type of non-crystalline solids between inorganic and organic materials" Journal of Non-Crystalline Solids (1985) 73: 681-689.
Kramer et al., "Organically Modified Silicate Aerogel, Aeromosil" Mat. Res. Soc. Symp. Proc. (1996) 435: 295-300.

* cited by examiner

*Primary Examiner*—Irina S Zemel
(74) *Attorney, Agent, or Firm*—Poongunran Muthukumaran

(57) ABSTRACT

The present invention relates to cross-linked polyolefin aerogels in simple and fiber-reinforced composite form. Of particular interest are polybutadiene aerogels. Especially aerogels derived from polybutadienes functionalized with anhydrides, amines, hydroxyls, thiols, epoxies, isocyanates or combinations thereof.

13 Claims, No Drawings

POLYOLEFIN-BASED AEROGELS

CROSS-REFERENCES TO RELATED APPLICATIONS

This application claims benefit of priority from U.S. Provisional Patent Application 60/631,235 filed Nov. 26, 2004 and is hereby incorporated by reference in its entirety.

STATEMENT REGARDING FEDERALLY SPONSORED RESEARCH OR DEVELOPMENT

This invention was partially made with Government support under Contracts NAS9-03028 and NNJ04JA22C awarded by the National Aeronautics and Space Administration (NASA.) The Government has certain rights in parts of this invention.

FIELD OF INVENTION

The invention described herein relates generally to polyolefin-based aerogels, and particularly to polybutadiene-based aerogels monolith and composites and their preparation methods.

Aerogels, invented in 1931 by Kistler, (Kistler, S. S., "Coherent Expanded Aerogels and Jellies." Nature, 127, 741 (1931) and "Coherent Expanded Aerogels." J. Physical Chem., 36, 52 (1932)), are formed from a gel by replacing the liquid phase with air. The first aerogels produced by Kistler had silicon dioxide (silica) as the solid phase of the gel structure. Silica gels can be formed via polymerization of silicic acid ($Si(OH)_4$). Ever since aerogels were invented in 1931, the unique properties of these materials have been well documented. Silica aerogels prepared via sol-gel processing can exhibit extremely low density, high surface area, and attractive optical, dielectric, thermal and acoustic properties. For example, a more detailed description can be found in the following references: LeMay et al., "Low-Density Microcellular Materials", MRS Bulletin, December 1990, p. 19-44, and D. Schaefer, "Structure of mesoporous aerogels", MRS Bulletin, April 1994, p. 49-53. These excellent properties explain why aerogels have been considered for use in many important applications such as thermal insulations. Aerogel-like materials can be prepared under ambient pressure. The ambient pressure drying process is called the "xerogel" process, and produces a material from an organic or inorganic based wet gel with aerogel like properties by driving solvent out of a gelled matrix. For example, U.S. Pat. No. 5,478,867 disclosed a microporous isocyanate-based xerogel composition and method of preparation using a vacuum oven. However, this ambient pressure drying process generally shows more shrinkage and damage due to high surface tension forces during drying. Moreover, the drying time for xerogels is relatively very long.

Another approach to making aerogels is to dry the gel matrix in a supercritical fluid medium. Kistler used a supercritical alcohol process to dry the gel matrix. Such processes, though successful, are energy intensive due to the higher critical points of alcohols. Another approach is to use supercritical carbon dioxide which has a relatively lower critical point. During supercritical drying, the temperature and the pressure are increased beyond the critical point where the phase boundary between the liquid and vapor phase disappears. Once the critical point is passed, there is no distinction between the liquid and vapor phase and the solvent can be removed without introducing a liquid-vapor interface, capillary pressure or any associated mass transfer limitations. This critical step is controlled by two important phenomena: permeability and capillary stress. The nature of supercritical drying (low temperature extraction or high temperature extraction) strongly influences the structural characteristics of the aerogel. There have been significant advances made in the removal of solvent from the wet gel form and have greatly simplified the preparation of aerogels and, in turn, improved their economic viability for commercial manufacturing. Liquid $CO_2$ is generally used as the supercritical extraction fluid, since this liquid has a much lower critical point than alcohol or water (common process solvents for silica aerogels) and the process can be performed at near ambient temperature. A good description of supercritical drying technology may be found in recent process patent, U.S. Pat. No. 6,670,402, which discloses a rapid aerogel production process utilizing a unique supercritical fluid—pressure modulation technique. An example of supercritical drying of organic aerogels can also be found in U.S. Pat. No. 5,962,539, which discloses a process and equipment for drying a polymeric aerogel in the presence of a supercritical fluid.

The unique porous nanostructure was also reported in organic and carbon based aerogels as well as other inorganic metal oxides produced in situ sol-gel processing. A good description can be found in Pekala and Schaefer, "Structure of organic aerogels. 1. Morphology and Scaling", Macromolecules 26, 5487 (1993). Kistler first prepared organic aerogels based on natural products and their derivatives. Pekala and co-workers developed several new organic aerogels. More details can be found in the following references: Polym. Preprints, 29, 204 (1988), Polym. Preprints 30, 221 (1989), U.S. Pat. Nos. 4,873,218, 4,997,804, 5,081,163, 5,086,085, 5,476, 878. Biesmans et al. developed polyisocyanate based organic aerogels and/or their carbon aerogel including polyurethane aerogel and details can be obtained from following references: "Polyurethane based organic aerogels' thermal performance" J Non-Cryst. Solids, 225, 36 (1998), "Polyurethane based organic aerogels and their transformation into carbon aerogels" J Non-Cryst. Solids, 225, 64 (1998), U.S. Pat. Nos. 5,484,818, 5,942,553, 5,869,545, and 5,990,184 describe, Polyisocyanate based organic aerogels and their preparation methods.

Although silica aerogels exhibit many unusual and useful properties, they still have problems of fragility, brittleness, and hydrophilicity. There are several attempts devoted to overcoming weakness and brittleness of silica aerogels. Development of the flexible fiber reinforced silica aerogel composite blanket was one of the promising approaches. For example, U.S. Pat. No. 6,068,882 discloses forming aerogels interstitially within a fiber matrix. For certain applications requiring mechanical durability under dynamic conditions such as clothing, fiber-reinforced silica aerogel composites may have problems of excessive dust generation due to the fragile nature of silica aerogels. Organic aerogels including inorganic-organic hybrid aerogels have been observed to have much improved impact and flexural strength. For example, more detailed high strength organic aerogels including inorganic-organic hybrid aerogel can be found in following references: Tan et al, "Organic Aerogels with Very High Impact Strength" Advanced. Materials. 13, 644 (2001), Leventis et al, "Nanoengineering Strong Silica Aerogels", Nano Letters, 2, 957, (2002), and Zhang et al, "Isocyanate cross-linked silica, structurally strong aerogels" Polymer Preprint, 44, 35 (2003). These high strength aerogels are also very brittle with little elongation (i.e., less rubbery), and generate dust. More flexible aerogels have been referred to as Ormosils by Shumidt H., "New type of non-crystalline solids between inorganic and organic materials", J Non-Cryst. Solids, 73, 681(1985) or Aeromosil by Kramer et al., "Organically Modified Silicate Aerogel, Aeromosil" Mat. Res. Soc. Symp. Proc. 435, 295 (1996). These materials still exhibit weakness and dust generation problems, although they are significantly tougher and more resilient than pure silica aerogels. For insulation applications requiring a significant amount of motion (tensile, compressive, flexural, shear) applied to the insulation structure, there is clearly a need to develop less stiff and non-fragile aerogels.

The present invention relates to polyolefin-based aerogel monoliths and composites and their preparation methods. This aerogel composition can offer flexible, less dusty and inherently hydrophobic material with excellent thermal and physical properties. Polybutadiene is offered as non-limiting example of polyolefin aerogels according to an embodiment of the present invention. Embodiments of the invention can be employed in thermal and acoustic insulation, radiation shielding, and vibrational damping as well as in various aerospace, military, oil and gas, and petrochemical refining applications among many others.

SUMMARY

The present invention relates to cross-linked polyolefin aerogels in simple and fiber-reinforced composite form. Of particular interest are polybutadiene aerogels. Especially aerogels derived from polybutadienes functionalized with anhydrides, amines, hydroxyls, thiols, epoxies, isocyanates or combinations thereof.

DESCRIPTION

Aerogels can be prepared using polyolefins as precursors. Such polymers in the linear form are preferably cross-linked to obtain a stronger gel structure which can better withstand pore collapse due to drying. Embodiments of the present invention provide for cross-liked polyolefins that when supercritically dried, result in aerogels. Within the context of the present description, an "aerogel" or "aerogel material" refers in a general sense to gels containing air or a gas as a dispersion medium and in a specific sense to aerogels that are dried supercritically, xerogels that are dried at ambient pressures and cryogels that are dried at very low temperatures.

In one embodiment the polyolefin aerogels are prepared via at least one cross-linking compound (referred to hereafter as a "hardner".) The hardner and the polyolefin are functionalized such that the functional groups mutually react thereby forming a stable chemical bond between the two. Suitable functional groups for the polyolefin or hardner include but are not limited to: anhydrides, amines, hydroxyls, thiols, epoxies, isocyanates, their derivatives and any combination thereof. That is, more than one type of functional group may exist on a polyolefin chain, a hardner or both.

In one embodiment of the present invention a maleinized polybutadiene (or polybutadiene adducted with maleic anhydride) is used to prepare aerogels and composites. Such aerogels can be prepared by mixing a maleinized polybutadiene resin, a hardener comprising a functional group, and a catalyst in a suitable solvent and maintaining mixture in a quiescent state for a sufficient period of time to form a polymeric gel. Optionally, the gel is aged at an elevated temperature (i.e. above room temperature) for a period of time to provide uniformly stronger wet gel before drying. Drying can be accomplished with a supercritical fluid such as $CO_2$ and other suitable fluids. The hardner functional groups can be anhydrides, amines, hydroxies, thiols, epoxies, isocyanates, their derivatives and any combination thereof. That is, more than one type of functional group may exist on said hardner. Preferably the functional groups are hydroxyl groups, amines, epoxies or a combination thereof. The resultant maleinized polybutadiene aerogel comprises an open-pore structure, which provides inherently hydrophobic, flexible, less dusty aerogels with excellent thermal and physical properties. The materials of the present invention can be used as thermal and acoustic insulation, radiation shielding, and vibrational damping materials.

The purpose of the ensuing description is to better illustrate the invention as a whole through certain embodiments thereof which are not to be used as limitations in nature, spirit or scope of the present invention. Accordingly, embodiments involving the preparation of polybutadiene aerogels (or maleinized polybutadine aerogels) are presented in a non-limiting exemplary manner.

In an embodiment, polybutadiene resin is prepared by adding maleic anhydride into 1,2 polybutadiene resin. Maleinized polybutadiene resin for use can have a maleic anhydride content of between 5 and 20%, preferably between 10 and 20%, and more preferably between 15 and 20%, and an anhydride equivalent weight of between 400 and 1700, preferably between 450 and 700. The number average molecular weight of maleinized polybutadiene resin for use ranges from about 1,400 to about 15,000, preferably from about 2,000 to about 6,000. Of particular interest are maleinized polybutadiene resins containing maleic anhydride groups per polybutadiene chain in the range of 2 to 12, preferably between 3 and 11. Vinyl content of maleinized polybutadiene resin varies from 30% to 90% and viscosities range from 65 poise at 25° C. to 1700 poise at 55° C. These maleinized polybutadiene resins are exemplified by Ricon® Resins commercially available from Sartomer Company. The reaction mixture may contain about 0.5% to about 30% (wt) of polybutadiene resin, preferably between about 1% to 20% and more preferably between about 2% to 15%.

In one embodiment, the hardner may be in a polymeric, monomeric or both forms and comprise functional groups that can react with an anhydride group. Examples of these functional groups include but are not limited to: hydroxyls, thiols, amines, epoxies, any functional group with a reactive hydrogen atom or any combination of the foregoing. or other groups containing reactive hydrogen functional group, preferably hydroxyl, amine, or epoxy functional groups, preferably a hydroxyl or amine functional group.

Examples of hardeners containing hydroxyl functional group are the following compounds and their derivatives: 1,2-propane diol; 1,4-butane diol, 1,5-pentane diol, 1,6-hexane diol, 1,7-heptane diol, ethylene glycol, diethylene glycol, tetraethylene glycol, 1,2-propylene glycol, 1,3-propylene glycol, dipropylene glycol, 1,2-butylene glycol, 1,3-butylene glycol, 1,4-butylene glycol, glycerine, glycerol, 1,1,1-trimethylolpropane, 1,1,1-trimethylolethane, hexane-1,2,6-triol, alpha-methyl glucoside, pentaerythritol, erythritol and sorbitol, as well as pentols and hexols, glucose, sucrose, fructose, maltose and compounds derived from phenols such as (4,4'-hydroxyphenyl)2,2-propane, bisphenols, alkylphenols such as dodecylphenol, octylphenol, decylphenol, polyester polyols, polyether polyols, modified polyether polyols, polyester ether polyols, castor oil polyols, and polyacrylate polyols. Preferred monomeric hardeners containing hydroxyl functional groups include but are not limited to: ethylene glycol, glycerol, erythritol and sorbitol, pentol, hexol, glucose, sucrose, fructose, bisphenol, and decylphenol. Preferred polymeric hardeners containing hydroxyl functional groups include but are not limited to polyether polyols which are described in more detail, for example, in G. Oertel, Kunststoffhandbuch, Vol. 7, pages 57-75 (Carl Hanser Verlag, 3rd edition, Munich/Vienna 1993) and U.S. Patent Application No. 2002/0111453. Suitable polyether polyols may be produced in accordance with any of the known methods. In one of the commonly used methods, a starter compound is alkoxylated, preferably with ethylene and/or propylene being used as the alkoxylation agent. Starting compounds are preferably selected from hydroxyl group-containing compounds which will result in the desired functionality of the polyether polyol.

Preferably the polyether polyol for use in the present invention has an OH number of between 30 and 1000 mg KOH/g, preferably between 100 and 800 mg KOH/g, functionality of between 2 and 6, preferably between 3 and 6. The average molecular weight of the polyether polyol is preferably between 100 and 6000, more preferably between 200 and 4000.

Such polyether polyols are exemplified by: Multranol 9181, Multranol 4050, Multranol 9171, Multranol 4030, Multranol 8117, and Multranol 9185 all of which are commercially available from Bayer Corporation. Other commercially available polyether polyols include: Voranol 360, Voranol 391, Voranol 446, Voranol 490, Voranol 520, Voranol 800 (from Dow Chemical Company).

Examples of amines suitable for reaction with anhydrides include the following compounds and their derivatives: methylamine, ethylamine, diethylamide, ethylmethylamine, triethylamine, triethanolamine, n-propylamine, allylamine, isopropylamine, n-butylamine, n-butylmethylamine, n-amylamine, n-hexylamine, 2-ethylhexylamine, cyclohexylamine, ethylenediamine, 1,4-butanediamine, 1,6-hexanediamine, N-methylcyclohexylamine, polyethyleneamine, and polyoxyalkyleneamines (polyetheramines). Preferred monomeric hardeners containing amine functional groups include but are not limited to: ethylenediamine, 1,4-butanediamine, and 1,6-hexanediamine. Preferred polymeric hardeners containing amine functional groups include but are not limited to polyoxyalkyleneamines and include polyoxyethylene-propylenemonoamines, polyoxypropylenediamines, and polyoxypropylenediamines. The average molecular weight of the polyoxyalkyleneamines is preferably between about 1000 and about 6000, preferably between about 2000 and about 5000. Such polyoxyalkyleneamines are exemplified by Jeffamine M-2005 (XTJ-507), Jeffamine D-2000, Jeffamine D-4000 (XTJ-510), Jeffamine T-3000 (XTJ-509), and Jeffamine T-5000 all commercially available from Huntsman Corp.

The hydroxyl functionalized hardeners used in embodiment of the present invention are preferably in such an amount that the ratio between functional groups in the polyolefin (e.g. anhydrides in maleinized polybutadiene) and in the hardener (Hydroxyl groups) is between about 1:0.01 and about 1:5, preferably between about 1:0.1 and about 1:3. The amine functionalized hardeners in embodiments of the present invention are used in such an amount that the ratio between functional groups in the polyolefin (e.g. anhydrides in maleinized polybutadiene) and in the hardener (amine groups) is between about 1:0.01 and about 1:5, preferably between about 1:0.05 and about 1:2

Hardeners containing hydroxyl functional groups typically provide more uniform gelation, a more flexible and less fragile aerogel network structure, and less dust. The hardeners containing amine functional groups typically are easier to process, exhibit quick gelation times, more rigid aerogels, and better thermal conductivity properties. However, either or both functionalized hardners may be desired depending on the reaction mixture, reaction conditions and final gel properties.

The preferable catalysts for use in the present invention comprise any of those catalysts known in the art to promote urethane and/or urea reactions such as but not limited to the following and their derivatives: aliphatic and aromatic compounds, certain primary, secondary and tertiary amines, long chain alkylamide compounds such asethylamine, 1-benzofuran-2-amine, 4-quinolylamine, [1,1'-binaphthalene-3,3',4,4'-tetrayl]tetraamine, p-aminobenzoic acid, dimethylamine, N-methylethanamine, diethylamine, N-methylisopropylamine, N-isopropylcyclobutanamine, N,2-dimethyl-3-pentanamine, N,N-dimethylethanamine, N-methyldiethanamine, N-ethyl-N-methyl-3-hexanamine didecylmethylamine (DAMA-1010 amine, tertiary amine of 98.9 wt %, commercially available from Albemarl Corporation), and organometallic compounds, particularly those containing tin (such as stannous octoate and dibutyltin dilaurate), alkali metal salts, (such as those, commercially available from Atofina Chemicals Inc.), stannous bis (2-Ethylhexoate) (FASCAT 2003), dibutyltin diacetate (FASCAT 4200), and dibutyltin dilaurate (FASCAT 4202).

The preferable catalysts for use in embodiments of the present invention also include but are not limited to isocyanate trimerisation catalysts (such as quaternary ammonium hydroxides), alkali metal and alkaline earth metal hydroxides, alkoxides and carboxylates. Other examples include potassium acetate and potassium 2-ethylhexoate, non-basic metal carboxylates (such as lead octoate), and symmetrical triazine derivatives. Preferred trimerisation catalysts for use in the present method are Tris(dimethylaminopropyl)hexahydrotriazin (Polycat 41), and N-hydroxypropyltrimethyl ammonium-2-ethylhexanoate (DABCO TMR), 2-hydroxypropyl trimethylammonium formate (DABCO TMR-2), and N-hydroxy-alkyl quarternary ammonium carboxylate (DABCO TMR-4) available from Air Products. More preferable catalysts include triethylamine, triethanolamine diphenylamine, didecylmethylamine (DAMA-1010), stannous bis (2-Ethylhexoate) (FASCAT 2003), dibutyltin diacetate (FASCAT 4202), Tris(dimethylaminopropyl)hexahydrotriazin (Polycat 41), N-hydroxypropyltrimethyl ammonium-2-ethylhexanoate (DABCO TMR), and 2-hydroxypropyl trimethylammonium formate (DABCO TMR-2).

The amount of catalyst used in embodiments of the present invention depends on the amount of maleinized polybutadiene resin and hardener material, the reaction temperature, solvent type and amount, and additives incorporated (such as opacifiers and reinforcement material). The preferred catalyst amount in an embodiment the present invention is such that the ratio between the total weight of maleinized polybutadiene resin and hardener to catalyst is between about 1:0 (0 wt % catalyst) and about 1:0.2 (20 wt % catalyst), preferably between about 1:0.001 (0.1 wt % catalyst) and about 1:0.1 (10 wt % catalyst).

The solvent for use in embodiments of the present invention should be non-reactive with the resin(s), its cross linked forms, the hardener(s) and catalyst. The preferable solvent would form a homogeneous solution with other reaction components and dissolve the reaction product or at least prevent rapid precipitation or phase separation therein. Suitable solvents for use in embodiments of the present invention include but are not limited to: hydrocarbons, dialkyl ethers, cyclic ethers, ketones, alkyl alkanoates, aliphatic and cycloaliphatic hydrofluorocarbons, hydrochlorocarbons, hydrochlorofluorocarbons, chlorofluorocarbons, halogenated aromatics and fluorine-containing ethers. Furthermore, a mixture of these solvents an also be used.

Examples of suitable hydrocarbon solvents include lower aliphatic or cyclic hydrocarbons such as ethane, propane, n-butane, isobutane, n-pentane, isopentane, cyclopentane, neopentane, hexane, cyclohexane, benzene, xylene, and toluene. Suitable dialkyl ether compounds may have from 2 to 6 carbon atoms. Examples of suitable ethers include dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether. Suitable cyclic ethers include tetrahydrofuran among others. Suitable dialkyl ketones include acetone, cyclohexanone, methyl t-butyl ketone and methyl ethyl ketone. Suitable alkyl alkanoates include methyl formate, methyl acetate, ethyl formate, butylacetate and ethyl acetate. Suitable hydrofluorocarbons which may be used as solvent include lower hydrofluoroalkanes, such as difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane (and its isomers), tetrafluoropropane (and its isomers) and pentafluoropropane (and its isomers.) Substantially fluorinated or perfluorinated (cyclo)alkanes having 2 to 10 carbon atoms can also be used. Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane. Suitable chlorofluorocarbons which may be used as solvent include trichlorofluoromethane, dichlorodifluoromethane, trichlorotrifluoroethane and tetrafluorodichloroethane. Suitable hydrochlorocarbons which may be used as solvent include 1- and 2-chloropropane and dichloromethane. Suitable halogenated aromatics include monochlorobenzene and dichlorobenzene. Suitable fluorine-containing ethers which may be used as solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

More preferred solvents for use in the present invention include toluene, methyl ethyl ketone, acetone, tetrahydrofuran, dichloromethane, monochlorobenzene, trichlorofluoromethane, chlorodifluoromethane, 1,1,1-trifluoro-2-fluoroethane and 1,1-dichloro-1-fluoroethane.

The solvent amount for use in embodiments of the present invention depends on the desirable density of the gel and additives used (such as opacifiers and reinforcement material). The nature and the amount of solvent that can be used may be based on the theoretical (or target) density of the gel. It is observed that the final density is generally higher than their theoretical density which is attributable to shrinkages occurring during aging and supercritical drying steps. The solvent amount for use in embodiments the present invention is preferably in such an amount that the density of the gel ranges from about 0.02 g/cm$^3$ to about 0.5 g/cm$^3$, preferably from about 0.03 g/cm$^3$ to about 0.4 g/cm$^3$, more preferably from about 0.05 g/cm$^3$ to about 0.3 g/cm$^3$.

In order to further improve the thermal and mechanical properties, the structural integrity, and the handling of the aerogel monoliths, various additives can be incorporated into the gel. In one embodiment IR opacifiers and/or reinforcement materials can be incorporated in the sol-gel process, preferably in an amount of between about 0.05 and about 50% by weight based on the weight of the resin and hardener. Examples of suitable IR opacifiers and reinforcement materials include carbon black (solution), carbon fiber, boron fiber, ceramic fiber, rayon fiber, nylon fiber, olefin fiber, alumina fiber, asbestos fiber, zirconia fiber, alumina, clay, mica, silicas, calcium carbonate, titanium dioxide, talc, zinc oxide, barium sulfates, wood and shell floor, polystyrene.

Reinforcement materials such as fibers in aggregates or continuous forms can be added to the gel prior to onset of gelation. Forms of fibers include but are not limited to chopped fibers, battings, mats, felts or combinations thereof. Aerogels reinforced with a fiber batting are explained in detail in US patent application published under number US2002/0094426A1 which is hereby incorporated by reference in its entirety. The reinforcing fibers used at the bottom and/or top of the mould in which the monolith is cast to give structural strength. Alternately, all the materials in a sol or slurry form can be infused into a fibrous batting and allowed to gel. Fibers can be based on or comprise Polyesters, polyolefin terephthalates, poly(ethylene) naphthalate, polycarbonates, (examples Rayon, Nylon), cotton, (e.g. lycra manufactured by DuPont), carbon (e.g. graphite), polyacrylonitriles(PAN), oxidized PAN, uncarbonized heat treated PANs (such as those manufactured by SGL carbon, fiberglass based material like S-glass, 901 glass, 902 glass, 475 glass, E-glass,) silica based fibers like quartz, (e.g. quartzel manufactured by Saint-Gobain), Q-felt (manufactured by Johns Manville), Saffil (manufactured by Saffil), Durablanket (manufactured by Unifrax) and other silica fibers, Polyaramid fibers like Kevlar, Nomex, Sontera (all manufactured by DuPont) Conex (manufactured by Taij in), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by GORE), Silicon carbide fibers like Nicalon (manufactured by COI Ceramics), ceramic fibers like Nextel (manufactured by 3M), Acrylic polymers, fibers of wool, silk, hemp, leather, suede, PBO—Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS.

In an embodiment of the present invention, the solids content of the reaction mixture is preferably between about 2 and about 30% by weight, more preferably between about 3 and about 25% by weight, most preferably between about 4 and about 20% by weight.

In general a solution comprises functionalized resins (such as maleinized polybutadiene resins), hardeners with functional groups, and solvent. Subsequently, the catalyst is added thereto. Alternatively the resin (e.g. maleinized polybutadiene) is dissolved in a marginal part of the solvent and the hardener solution in a marginal part of the solvent is added thereto. Subsequently a solution of the catalyst in the residual amount of solvent is added. Mixing can be done at room temperature or higher temperatures that are above room temperatures but below the boiling temperature of solvent(s) used.

Thereafter, the mixture is left standing for a certain period of time to form a polymeric gel. This time period varies from about 30 seconds to several days, even weeks and months, depending on the types of ingredient materials, the ratio between functional groups in the resin (e.g maleinized polybutadiene) and in the hardener, catalyst content, and the target density. The gelation time is preferably between about 30 second and about 6 hours. The more preferable time to form a polymeric gel ranges from about 3 minute to about 4 hours. Temperatures in the range of about −10° C., to about 50° C., preferably 10° C. to 50° C. may be employed in gelation.

In some embodiments in order to form more uniform wet gel, it is recommended to stabilize the wet gels at room temperatures for short period so that handling is easier during subsequent processing. This step is important in processing gels prepared with lower target density, which can be structurally weak. The typical period for this process varies from about 5 min to about 20 hrs at room temperature and preferably between about 30 minutes and about 2 hours.

Although the precursor solutions can gel within a few seconds, a few minutes, or a few hours, it is preferred as per an embodiment of the present invention, to age (post-cure) the wet gels at elevated temperatures for a certain period of time so as to obtain a stronger gel that can be easily handled during subsequent processing. Aging at higher temperatures reduces the time needed to obtain a stronger gel, promotes cross-linking of pendant, un-reacted functionalities, generates better solid/liquid homogeneity within the gel structure, and reduces the concentration of any un-reacted monomers. Therefore, the wet gels can be aged at elevated temperatures for a certain period of time until the weak polymeric wet gel becomes strengthened. This aging process is preferred in processing weak gels prepared with lower target density. The preferable aging time period for use in an embodiment of the present invention varies from 1 hour to several days, more preferably, ranges from about 2 hours to about 48 hrs. Aging temperatures ranges from about 30° C. to about 100° C., preferably from about 40° C. to about 80° C. Preferred aging solvents for use in the present invention are toluene, methyl ethyl ketone, acetone, tetrahydrofuran, dichloromethane, monochlorobenzene, trichlorofluoromethane, chlorodifluoromethane, 1,1,1-trifluoro-2-fluoroethane, 1,1-dichloro-1-fluoroethane. The aging solvent is preferably added in such an amount as to form solvent layer over wet gel surface.

Thereafter, the polyolefin based aerogels (e.g. maleinized polybutadiene aerogels) can be obtained from their wet gels after supercritical drying. The preferable supercritical drying step for in an embodiment of the present invention includes placing the solvent-filled gel in a temperature-controlled pressure vessel and bringing the vessel to a pressure above the critical pressure of the $CO_2$ by filling with $CO_2$ gas or pumping liquid $CO_2$. In another embodiment, before the supercritical drying step, the solvent filled in the wet gel can be exchanged by a liquid carbon dioxide. Modifiers can be added to the carbon dioxide to make them more suitable for supercritical drying. At that point the vessel is then heated above the critical temperature of the $CO_2$. After a few hours the pressure is slowly released from the vessel while keeping a constant temperature. After pressure vessel cools down at atmospheric pressure, the aerogels are removed from the vessel.

Densities of the maleinized polybutadiene based aerogels obtained by using the process of the present invention are generally in the range from about 0.02 g/cm$^3$ to about 0.5 g/cm$^3$, preferably from about 0.01 g/cm$^3$ to about 0.4 g/cm$^3$, more preferably from about 0.05 g/cm$^3$ to about 0.3 g/cm$^3$. Densities of final aerogels may be higher than their theoretical values, due to shrinkage during the drying step.

The maleinized polybutadiene based aerogels prepared according to an embodiment of the present invention generally have pore sizes in the range of about 1 to about 100 nm as measured by Brunauer-Emmet-Teller (BET) nitrogen adsorption method (The average pore diameter is calculated as 4V/A with V=cumulative pore volume per gram of material and A=specific surface area.) More typically the pore sizes are in the range of about 2 to about 40 nm. BET surface areas of the aerogels prepared according to the process of the present invention are generally in the range of about 1 to about 500 m$^2$/g.

The thermal conductivity coefficient of the maleinized polybutadiene based aerogels monoliths and composite depends on the final aerogel densities. At about 30 C and atmospheric pressure the maleinized polybutadiene based aerogels prepared according to an embodiment of the present invention generally exhibit thermal conductivity coefficients between about 5 and about 50 mW/m K, more typically between about 15 to about 40 mW/m K.

The potential applications for the polyolefin-based aerogels include, uses for thermal and acoustic insulation, radiation shielding, and vibrational damping materials in aerospace, military, and commercial applications. For example, space suit insulation, glove insulation, footwear insulation, foot bed insulation, apparel insulation, helmet or headwear insulation, catalyst supports, selectively permeable membrane, sensor materials, packing material, aircraft, oil pipelines, cryogenic tanks, liquefied gas transport and specifically in pipeline transport, systems for warming, storing, and/or transporting food and medicine, sleeping bags and pads, military and recreational cloth and tents and many others. The present maleinized polybutadiene aerogels can be also used or recycled for use as impact modifiers and/or filler materials for conventional plastics.

In one embodiment of the present invention, the harder comprises species in polymeric, oligomeric or monomeric form or a combination thereof. Generally, polymers have molecular weights above about 8000, oligomers between about 8000 and 300 and monomers less than about 300.

In another embodiment, opacifying compounds incorporated into the gel. Examples of these opacifiers include but are not limited to: $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide or mixtures thereof.

In another embodiment, the polyolefin is derived from butadienes, isoprenes, chloroprenes, EPDMs or a combination thereof.

In another embodiment the polyolefin functional groups comprises hydroxyl, amine, epoxy, anhydride, thiol or isocyanate groups and the hardner comprises comprises hydroxyl, amine, epoxy, anhydride, thiol or isocyanate group. Herem, reaction between the functional groups on the polyolefin and the hardner result in an amic acid, amide, Imide, ester, urea, carbamate or any other chemical linkage.

The following examples using a maleic anhydride functionalized polybutadiene are provided to illustrate the embodiments of the present invention. These examples are not to be construed to limit the nature or scope of the invention. Various polyolefins, functionalizations, hardeners and catalysts as previously described are applicable. These examples are provided for the sole purpose of better illustrating the techniques involved in the present invention and aid in practicing different embodiments thereof.

Polyolefin Resins

Recon 130MA20: a maleinized polybutadiene resin available from Sartomer Company, Inc., having anhydride equivalent weight of 490, maleic anhydride content of 20%, and the number average molecular weight of about 3,100.

Recon 156MA17: a maleinized polybutadiene resin available from Sartomer Company, Inc., having anhydride equivalent weight of 577, maleic anhydride content of 17%, and the number average molecular weight of about 2,500.

Multranol 9185: polyether polyol specially modified with ethylene oxide available from Bayer Corporation, having an OH number of 100 mg KOH/g, functionality of 6, and the number average molecular weight of about 3,400.

Voranol 800: aliphatic-amine initiated polyether polyol available from Dow Chemical Company, having an OH number of 800 mg KOH/g, functionality of 4, and the number average molecular weight of about 278.

Triethylamine: a tertiary amine available from Aldrich, FASCAT 2003 (dibutyltin diacetate): a polyurethane catalyst available from Atofina Chemicals, Inc., DABCO TMR (N-hydroxypropyltrimethyl ammonium-2-ethylhexanoate): a trimerisationcatalyst available from Air Products.

EXAMPLE 1

5.57 g of Recon 130MA20 dissolved in 87.68 g acetone. 6.62 g of Multranol 9185 (hardener) was added to this solution and blended until a homogeneous solution was obtained. A solution 0.122 ml of triethylamine catalyst was further added to the above solution. After stirring thoroughly to ensure homogeneous dispersion of the catalyst throughout the liquid mixture for 1 min, the catalyzed solution was allowed to gel in a closed container for about 30 minutes. Additional acetone was added to the gel to make sure no solvent-evaporation-related surface-modifications or pore-collapse occured. The gel was further aged in an oven at 50° C. for about 20 hours.

The aged gel was transferred to a pressure vessel and exchanged with liquid carbon dioxide and subsequently dried at a supercritical condition of 1500 psig and 50° C. After drying the gel sample for about an hour, the pressure in the vessel was released slowly and the dried aerogel obtained was removed from the pressure vessel.

The obtained maleinized polybutadiene based aerogel was opaque and had slightly yellow color, perhaps due to the effect of the color of the initial maleinized polybutadiene resin. Density of the obtained gel was 0.1748 g/cm$^3$, which calculates in a shrinkage factor (final dried density/target density based on initial mixed composition) of about 1.75. The pore structure of the obtained aerogel was characterized by using Brunauer-Emmet-Teller nitrogen adsorption (BET) measurements. BET measurements on the sample showed a surface area of 5 m$^2$/g. Thermal conductivity at a single temperature (about 30° C. which is the average of hot and cold side temperatures) was measured according to standard ASTM C177 in the air at atmospheric pressure and showed 23.5 mW/m K.

A quartz fiber reinforced maleinized polybutadiene based aerogel composite was also prepared in a similar manner except that before gelation, the solution was mixed with quartz fibers. This composite exhibited a density of 0.1695 g/cm$^3$ and thermal conductivity of 25.5 mW/m K.

EXAMPLE 2

7.68 g of Recon 130MA20 was dissolved in 87.64 g of acetone and 4.56 g of Multranol 9185 was mixed with the solution and homogenized. Next, 0.122 ml of triethylamine catalyst was added to said mixture. The method as described in example 1 was repeated to make an aerogel monolith and a fiber reinforced aerogel composite.

The resultant maleinized polybutadiene aerogel was opaque and slightly yellow in color and showed the following properties: density of 0.2102 g/cm$^3$ (shrinkage factor of about 2.10), a surface area of 2 m$^2$/g. The thermal conductivity in the air at atmospheric pressure was 31.7 mW/m K. The quartz fiber reinforced aerogel composite of this example showed a density of 0.2050 g/cm$^3$ and thermal conductivity of 33.5 mW/m K.

EXAMPLE 3

3.60 g of Recon 130MA20 (maleinized polybutadiene resin) was dissolved in 87.71 g of acetone and 8.57 g of Multranol 9185 was added to the solution and homogenized. To this solution 0.122 ml of triethylamine catalyst was added and mixed for a minute. This mixture was processed through a similar method as in example 1.

The resultant maleinized polybutadiene aerogel was opaque and slightly yellow in color and showed the following properties: density of 0.1664 g/cm$^3$ (shrinkage factor of about 1.66), a surface area of 5 m$^2$/g. The thermal conductivity in the air at atmospheric pressure was 24.5 mW/m K. The quartz fiber reinforced aerogel composite of this example showed a density of 0.1562 g/cm$^3$ and thermal conductivity of 26.8 mW/m K.

EXAMPLE 4

2.82 g of Recon 130MA20 was dissolved in 93.76 g of acetone and 3.36 g of Multranol 9185 added and homogenized. To this solution 0.062 ml of triethylamine catalyst was added and mixed for a minute. This mixture was processed through a similar method as in example 1.

The resultant maleinized polybutadiene aerogel was opaque and slightly yellow color in color and showed the following properties: density of 0.0995 g/cm$^3$ (shrinkage factor of about 1.99), a surface area of 2 m$^2$/g. The thermal conductivity in the air at atmospheric pressure was 34.5 mW/m K. The quartz fiber reinforced aerogel composite of this example showed a density of 0.0956 g/cm$^3$ and thermal conductivity of 36.8 mW/m K.

EXAMPLE 5

8.26 g of Recon 130MA20 was dissolved in 81.75 g of acetone and 9.81 g of Multranol 9185 was added to the solution and homogenized. To this solution, 0.18 ml of triethylamine catalyst was added and mixed for a minute. This mixture was processed through a similar method as in example 1.

The resultant maleinized polybutadiene aerogel was opaque and slightly yellow in color and showed the following properties: density of 0.2264 g/cm$^3$ (shrinkage factor of about 1.51), a surface area of 8 m 2/g. The thermal conductivity in the air at atmospheric pressure was 21.5 mW/m K. The quartz fiber reinforced aerogel composite of this example showed a density of 0.2162 g/cm³ and thermal conductivity coefficient of 21.8 mW/m K.

EXAMPLE 6

4.80 g of Recon 156MA17 was dissolved in 88.62 g of acetone and 6.47 g of Multranol 9185 added to this solution and homogenized. To this solution 0.182 ml of triethylamine catalyst was added and mixed for a minute. This mixture was processed through a similar method as in example 1.

The resultant maleinized polybutadiene aerogel was opaque and slightly yellow in color showed the following properties: density of 0.1861 g/cm³ (shrinkage factor of about 1.86), a surface area of 2 m²/g. The thermal conductivity in the air at atmospheric pressure was 40.5 mW/m K. The quartz fiber reinforced aerogel composite of this example showed a density of 0.1562 g/cm³ and thermal conductivity of 39.8 mW/m K.

EXAMPLE 7

10.72 g of 130MA20 was dissolved in 88.62 g of acetone and 1.59 g of Voranol 800 was added to this solution and homogenized. To this solution 0.182 ml of triethylamine catalyst was added and mixed for a minute. This mixture was processed through a similar method as in example 1.

The resultant maleinized polybutadiene aerogel was opaque and showed the following properties: density of 0.1485 g/cm³ (shrinkage factor of about 1.49), a surface area of 8 m²/g. The thermal conductivity in the air at atmospheric pressure was 19.5 mW/m K. The quartz fiber reinforced aerogel composite of this example showed a density of 0.1562 g/cm³ and thermal conductivity of 20.8 mW/m K.

EXAMPLE 9

The same formulation and processing method as in Example 1 was used, except that triethylamine catalysts was reacted with 0.122 ml of polyurethane catalyst FASCAT 2003.

The resultant maleinized polybutadiene aerogel was opaque and showed the following properties: density of 0.1671 g/cm³ (shrinkage factor of about 1.67), a surface area of 7 m²/g. The thermal conductivity in the air at atmospheric pressure was 22.5 mW/m K. The quartz fiber reinforced maleinized polybutadiene based aerogel composite of this example showed a density of 0.1695 g/cm³ and thermal conductivity of 26.9 mW/m K.

EXAMPLE 10

The same formulation and processing method as in Example 1 was used, except that triethylamine catalysts was reacted with 0.122 ml of polyurethane catalyst DABCO TMR.

The resultant maleinized polybutadiene aerogel was also opaque and showed the following properties: density of 0.1931 g/cm³ (shrinkage factor of about 1.93), a surface area of 3 m²/g. The thermal conductivity in the air at atmospheric pressure was 20.3 mW/m K. The quartz fiber reinforced maleinized polybutadiene based aerogel composite of this example showed a density of 0.1995 g/cm³ and thermal conductivity of 20.7 mW/m K.

EXAMPLE 11

A catalyst solution was first prepared by blending 0.122 ml of triethylamine in 27.68 g of acetone. A mixture solution of maleinized polybutadiene resin and hardener was prepared in two steps. First 6.62 g of Multranol 9185 was dissolved in 60.0 g of acetone and subsequently 5.57 g of Recon 130MA20 was added and blended. Both solutions were mixed together thoroughly and same method as described in example 1 was followed.

The resultant maleinized polybutadiene aerogel was opaque and showed the following properties: density of 0.1436 g/cm³ (shrinkage factor of about 1.44), a surface area of 3 m²/g. The thermal conductivity in the air at atmospheric pressure was 18.5 mW/m K. The quartz fiber reinforced maleinized polybutadiene based aerogel composite of this example showed a density of 0.1397 g/cm³ and thermal conductivity t of 18.9 mW/m K.

We claim:

1. An aerogel material comprising a polybutadiene with cross-linkages, wherein the cross-linkages is a result of reactions between hydroxyl, amine, epoxy, anhydride, thiol or isocyanate groups in the polybutadiene and hydroxyl, amine, epoxy, anhydride, thiol or isocyanate groups of a hardner.

2. The material of claim 1 further comprising : $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, silicon carbide or mixtures thereof.

3. The material of claim 1 further comprising fibers in the form of chopped fibers, a batting, a mat, a felt or a combination thereof.

4. The material of claim 1 wherein the thermal conductivity at temperatures of about 30° C. and atmospheric pressures is about 50 mW/mK or less.

5. The material of claim 1 wherein the density is between about 0.03 and about 0.3 g/cm³.

6. An aerogel material comprising a polybutadiene with cross-linkages, wherein the cross linkages between polybutadiene chains comprises an amic acid, amide, imide, ester, urea, carbamate or a combination thereof.

7. A method of preparing an aerogel material comprising the steps of:
  dissolving an amount of a polybutadiene in a suitable solvent;
  adding an amount of hardner to the polybutadiene solution;
  adding a catalyst suitable for cross linking, to the solution;
  allowing the solution to form a gel; and
  drying said gel, wherein the polybutadiene comprises hydroxyl, epoxy, anhydride, thiol, isocyanate functional groups or a combination thereof.

8. The method of claim 7 wherein the gel is dried above the critical point of the solvent.

9. The method of claim 7 wherein the gel is dried in super-critical carbon dioxide.

10. The method of claim 7 further comprising a step of aging said gel before the drying thereof.

11. A product made by the method of claim 7.

12. A method of preparing an aerogel material comprising the steps of:
  dissolving an amount of a polybutadiene in a suitable solvent;
  adding an amount of hardner to the polybutadiene solution;
  adding a catalyst suitable for cross linking, to the solution;
  allowing the solution to form a gel; and
  drying said gel, wherein the hardner comprises hydroxyl, epoxy, anhydride, thiol, isocyanate functional groups or a combination thereof.

13. A method of preparing an aerogel material comprising the steps of:

dissolving an amount of a polybutadiene in a suitable solvent;

adding an amount of hardner to the polybutadiene solution;

adding a catalyst suitable for cross linking, to the solution;

allowing the solution to form a gel; and drying said gel, wherein the polybutadiene comprises anhydride functionalized polybutadiene.

* * * * *

UNITED STATES PATENT AND TRADEMARK OFFICE
CERTIFICATE OF CORRECTION

PATENT NO. : 7,691,911 B2
APPLICATION NO. : 11/287777
DATED : April 6, 2010
INVENTOR(S) : JeKyun Lee and George L. Gould It is certified that error appears in the above-identified patent and that said Letters Patent is hereby corrected as shown below:

Correct the spelling of the name of the second listed inventor from "Gerogle L. Gould" to "George L. Gould"

Signed and Sealed this
Eighth Day of May, 2012

David J. Kappos
*Director of the United States Patent and Trademark Office*